United States Patent
Barriac et al.

(10) Patent No.: US 9,844,040 B2
(45) Date of Patent: *Dec. 12, 2017

(54) METHODS AND APPARATUS FOR MULTIPLE USER UPLINK BANDWIDTH ALLOCATION

(71) Applicant: QUALCOMM Incorporated, San Diego, CA (US)

(72) Inventors: Gwendolyn Denise Barriac, Encinitas, CA (US); Simone Merlin, Solana Beach, CA (US); Sameer Vermani, San Diego, CA (US); Rahul Tandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,827

(22) Filed: Sep. 9, 2016

(65) Prior Publication Data

US 2016/0381675 A1    Dec. 29, 2016

Related U.S. Application Data

(63) Continuation of application No. 14/527,329, filed on Oct. 29, 2014, now Pat. No. 9,474,073.

(Continued)

(51) Int. Cl.
*H04W 4/00*     (2009.01)
*H04W 72/04*    (2009.01)
(Continued)

(52) U.S. Cl.
CPC ...... *H04W 72/0413* (2013.01); *H04B 7/0452* (2013.01); *H04J 1/00* (2013.01);
(Continued)

(58) Field of Classification Search
CPC ......... H04W 72/0453; H04W 72/0413; H04W 72/02; H04W 74/0816; H04B 7/0452; H04J 1/00
(Continued)

(56) References Cited

U.S. PATENT DOCUMENTS

2012/0082045 A1    4/2012 Liu et al.
2012/0182963 A1    7/2012 Kneckt et al.
(Continued)

FOREIGN PATENT DOCUMENTS

| CN | 103117833 A | 5/2013 |
| CN | 103138870 A | 6/2013 |
| WO | WO-2012064502 A1 | 5/2012 |

OTHER PUBLICATIONS

International Search Report and Written Opinion—PCT/US2014/063153—ISA/EPO—dated Feb. 13, 2015.
(Continued)

*Primary Examiner* — Sai-Ming Chan
(74) *Attorney, Agent, or Firm* — Knobbe, Martens, Olson & Bear, LLP

(57) ABSTRACT

Methods and apparatus for multiple user uplink are provided. In one aspect, method for wireless communication includes receiving an assignment of a frequency bandwidth for an uplink transmission of a station. The method further includes determining whether a portion of the assigned frequency bandwidth is unavailable for the uplink transmission. The method further includes selectively transmitting the uplink transmission based on whether the portion of the assigned frequency bandwidth is unavailable.

36 Claims, 8 Drawing Sheets

Related U.S. Application Data

(60) Provisional application No. 61/898,298, filed on Oct. 31, 2013, provisional application No. 62/052,417, filed on Sep. 18, 2014.

(51) Int. Cl.
*H04B 7/0452* (2017.01)
*H04J 1/00* (2006.01)
*H04W 72/02* (2009.01)
*H04W 74/08* (2009.01)

(52) U.S. Cl.
CPC ....... *H04W 72/02* (2013.01); *H04W 72/0453* (2013.01); *H04W 74/0816* (2013.01)

(58) Field of Classification Search
USPC .......................................................... 370/329
See application file for complete search history.

(56) References Cited

U.S. PATENT DOCUMENTS

| | | | |
|---|---|---|---|
| 2013/0148625 A1* | 6/2013 | Kim | H04L 1/0025 370/329 |
| 2013/0155953 A1 | 6/2013 | Chu et al. | |
| 2014/0079016 A1* | 3/2014 | Dai | H04L 5/0041 370/330 |
| 2015/0117368 A1 | 4/2015 | Barriac et al. | |

OTHER PUBLICATIONS

Minyoung Park: "IEEE 802.11ac: Dynamic Bandwidth Channel Access", ICC 2011-2011 IEEE International Conference on Communications—Jun. 5-9, 2011—Kyoto, Japan, IEEE, Piscataway, NJ, USA, Jun. 5, 2011 (Jun. 5, 2011), pp. 1-5, XP031908841.

* cited by examiner

METHODS AND APPARATUS FOR MULTIPLE USER UPLINK BANDWIDTH ALLOCATION

CROSS REFERENCE TO RELATED APPLICATIONS

This application is a continuation of U.S. patent application Ser. No. 14/527,329, filed Oct. 29, 2014, which claims priority under 35 U.S.C. §119(e) to U.S. Provisional Patent Application No. 61/898,298 entitled "METHODS AND APPARATUS FOR MULTIPLE USER UPLINK BANDWIDTH ALLOCATION" filed on Oct. 31, 2013 the disclosure of which is hereby incorporated by reference in its entirety. This application further claims priority under 35 U.S.C. §119(e) to U.S. Provisional Patent Application No. 62/052,417 entitled "METHODS AND APPARATUS FOR MULTIPLE USER UPLINK BANDWIDTH ALLOCATION" filed on Sep. 18, 2014 the disclosure of which is hereby incorporated by reference in its entirety

BACKGROUND

Field

Certain aspects of the present disclosure generally relate to wireless communications, and more particularly, to methods and apparatus for bandwidth allocation in multiple user uplink communication in a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions.

Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises receiving an assignment of a frequency bandwidth for an uplink transmission of a station. The method further comprises determining whether a portion of the assigned frequency bandwidth is unavailable for the uplink transmission. The method further comprises selectively transmitting the uplink transmission based on whether the portion of the assigned frequency bandwidth is unavailable.

Another aspect of the disclosure provides a method of wireless communication. The method comprises receiving a message instructing a station to send an uplink transmission. The method further comprises determining whether a clear channel assessment is busy during a time period after receiving the message and before transmitting an uplink transmission. The method further comprises selectively transmitting the uplink transmission based on the clear channel assessment.

Another aspect of the disclosure provides an apparatus for wireless communication. The apparatus comprising a receiver configured to receive an assignment of a frequency bandwidth for an uplink transmission of a station. The apparatus further comprising a processor configured to determine whether a portion of the assigned frequency bandwidth is unavailable for the uplink transmission. The apparatus further comprising a transmitter configured to selectively transmit the uplink transmission based on whether the portion of the assigned frequency bandwidth is unavailable.

Another aspect of the disclosure provides an apparatus for wireless communication. The apparatus comprising means for receiving an assignment of a frequency bandwidth for an uplink transmission of a station. The apparatus further comprising means for determining whether a portion of the assigned frequency bandwidth is unavailable for the uplink transmission. The apparatus further comprising means for selectively transmitting the uplink transmission based on whether the portion of the assigned frequency bandwidth is unavailable.

Another aspect of the disclosure provides an apparatus for wireless communication. The apparatus comprising means for receiving a message instructing a station to send an uplink transmission. The apparatus further comprises means for determining whether a clear channel assessment is busy during a time period after receiving the message and before transmitting an uplink transmission. The apparatus further comprises means for selectively transmitting the uplink transmission based on the clear channel assessment.

Another aspect of the disclosure provides a non-transitory computer readable medium. The medium comprising instructions that when executed cause a processor to perform a method of receiving an assignment of a frequency bandwidth for an uplink transmission of a station. The medium further comprising instructions that when executed cause a processor to perform a method of determining whether a portion of the assigned frequency bandwidth is unavailable for the uplink transmission. The medium further comprising instructions that when executed cause a processor to perform a method of selectively transmitting the uplink transmission based on whether the portion of the assigned frequency bandwidth is unavailable.

Another aspect of the disclosure provides a non-transitory computer readable medium. The medium comprising instructions that when executed cause a processor to perform a method of receiving a message instructing a station to send an uplink transmission. The medium further comprising instructions that when executed cause a processor to perform a method of determining whether a clear channel assessment is busy during a time period after receiving the message and before transmitting an uplink transmission. The medium further comprising instructions that when executed cause a processor to perform a method of selectively transmitting the uplink transmission based on the clear channel assessment.

DETAILED DESCRIPTION

Figure 1:
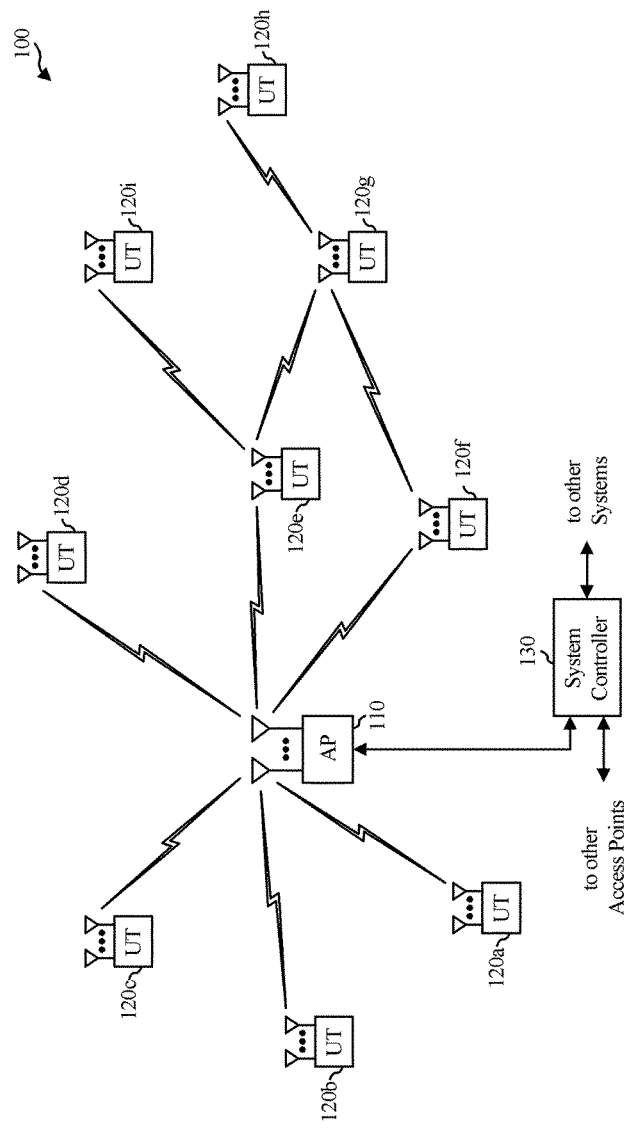
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may be used to transmit wireless signals across short distances, may be able to transmit signals less likely to be blocked by objects, such as humans, may allow for increased peer-to-peer services (e.g., Miracast, WiFi Direct Services, Social WiFi, etc.) in the same area, may support increased per-user minimum throughput requirements, supporting more users, may provide improved outdoor coverage and robustness, and/or may consume less power than devices implementing other wireless protocols.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
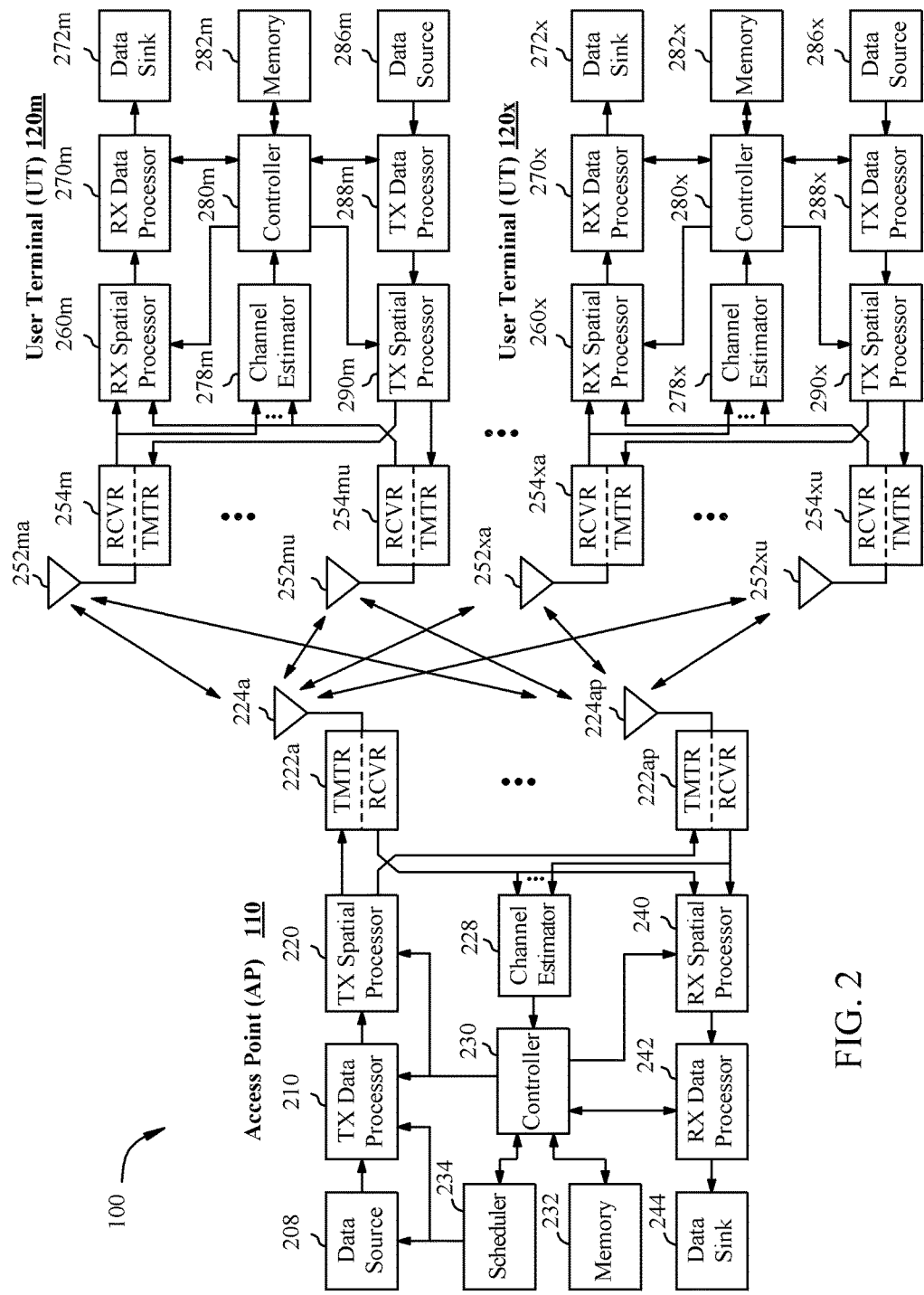
FIG. 2 illustrates a block diagram of the access point 110 and two user terminals 120m and 120x in a MIMO system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,n}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
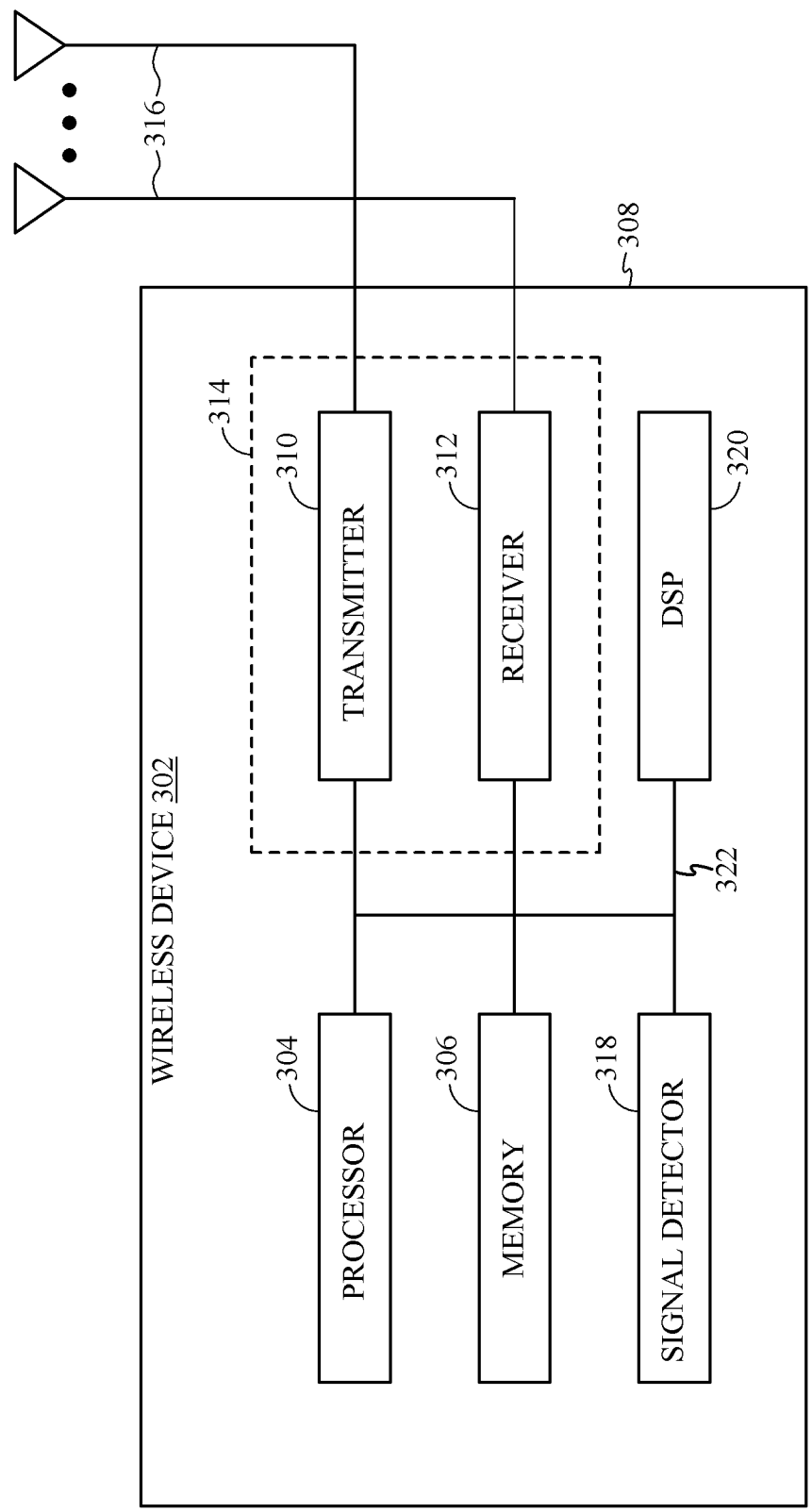
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
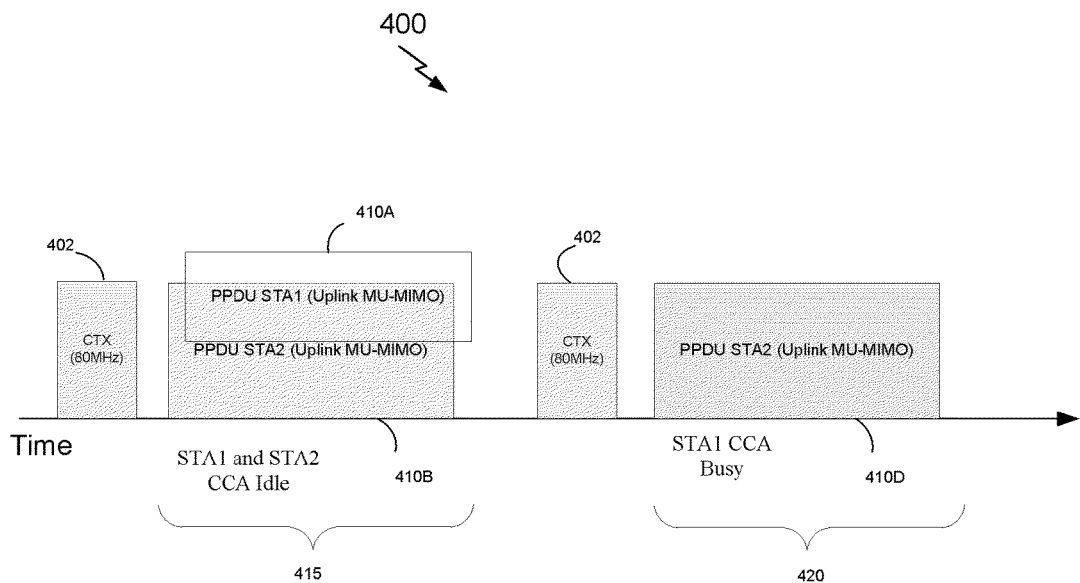
FIG. 4 shows a time diagram of an example frame exchange of an uplink (UL) MU-MIMO communication.
Figure 5:
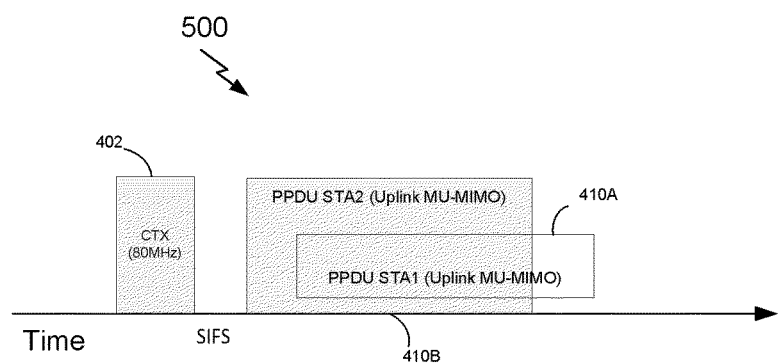
FIG. 5 shows a time diagram of another example frame exchange of an UL-MU-MIMO communication.
Figure 6:
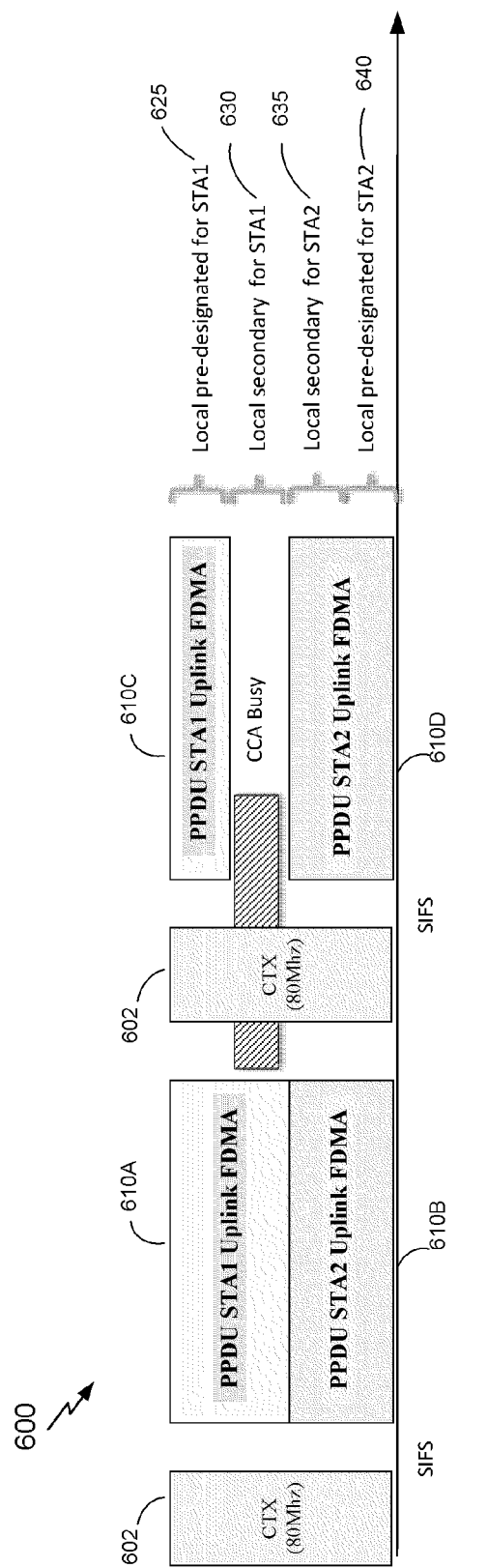
FIG. 6 shows a time diagram of an example frame exchange of an UL-FDMA communication.
Figure 7:
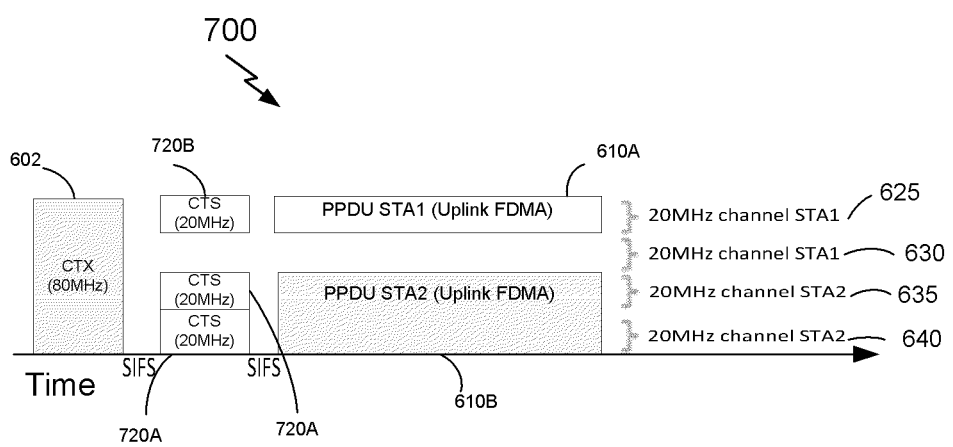
FIG. 7 shows a time diagram of an example frame exchange of an UL-FDMA communication.

Certain aspects of the present disclosure support transmitting an uplink (UL) signal from multiple STAs to an AP. In some embodiments, the UL signal may be transmitted in a multi-user MIMO (MU-MIMO) system. Alternatively, the UL signal may be transmitted in a multi-carrier FDMA (MC-FDMA) or similar FDMA system. Specifically, FIGS. 4-5, illustrate UL-MU-MIMO transmissions 410A, 410B, and 410D. FIGS. 6-7 illustrate UL-FDMA transmission 610A, 610B, 610C, and 610D. In these embodiments, UL-MU-MIMO or UL-FDMA transmissions are triggered by a frame sent by an AP and are initiated a short time after the frame. In some embodiments, the trigger frame may be sent with regular channel access rules, including the dynamic selection of available BW depending on a clear channel assessment (CCA) on a secondary channel at the AP. The AP may define transmission channels and streams per each STA for the UL transmissions. UL-MU-MIMO or UL-FDMA transmissions can be sent simultaneously from multiple STAs to an AP and may create efficiencies in wireless communication.

In some embodiments, the two or more STAs may transmit their UL-MU-MIMO or UL-FDMA transmissions regardless of whether at least a portion of the bandwidth is available, or regardless of whether a clear channel assessment (CCA) of the STAs indicates that the medium is busy, in response to receiving the frame from the AP 110. In some aspects, the AP 110 may set a flag or may set a field in the frame to a certain value to indicate that the two or more STAs should transmit their UL-MU-MIMO or UL-FDMA transmissions regardless of whether at least a portion of the bandwidth is available or regardless of the CCA of the STA in response to receiving the frame from the AP 110. In some aspects, the two or more STAs may be pre-configured to transmit their UL-MU-MIMO or UL-FDMA transmissions regardless of whether at least a portion of the bandwidth is available, or regardless of whether a clear channel assessment (CCA) of the STAs indicates that the medium is busy, in response to receiving the frame from the AP 110. Such uplink transmissions may fail if the bandwidth, or a portion of the bandwidth, is busy.

In some embodiments, the AP 110 may define certain bandwidth and streams per each STA. In some embodiments, some STAs may not be able to use the entire bandwidth or streams because other STAs are using a portion of the assigned bandwidth or streams. Certain aspects of the present disclosure support allocating which bandwidth (BW) and/or which streams each STA should use for the UL transmissions. FIG. 4 is a time sequence diagram illustrating an example of an UL-MU-MIMO protocol 400 that may be used for UL communications. As shown in FIG. 4, and in conjunction with FIG. 1, an AP 110 may transmit a clear to transmit (CTX) message 402 to STA1 and STA2 indicating that they may participate in a UL-MU-MIMO scheme and assigning STA1 and STA2 80 MHz to transmit an UL transmission. In this embodiment, if a STA detects that at least a portion of the assigned 80 MHz bandwidth is busy, the STA will not transmit an UL transmission. In FIG. 4, during time period 415, STA1 and STA2 each determine that their entire assigned 80 MHz bandwidth is available and their respective the clear channel assessment (CCA) indicate that the medium is idle. STA1 and STA2 can therefore both transmit their UL-MU-MIMO transmissions 410A and 410B, respectively over the assigned 80 MHz bandwidth. During time period 420, STA1's CCA indicates that at least a portion of the available bandwidth is busy and therefore STA1 does not send an UL transmission. STA2 however, does not detect any energy on the 80 MHz bandwidth and its CCA indicates that the medium is idle. STA2 therefore sends its UL-MU-MIMO transmission 410D over the assigned 80 MHz bandwidth. In some embodiments, the STA1 and STA2 may transmit their UL-MU-MIMO or UL-FDMA transmissions regardless of their respective CCAs indicating that the bandwidth or a portion of the bandwidth is busy. In some embodiments, STA1 and STA2 determine if the assigned BW is available by checking the energy on the medium PIFS time before they have to transmit. This can be done if the trigger frame (e.g., CTX) triggers the UL transmissions more than PIFS time after the end of the CTX. In order for the BW to be available, the NAV may also be checked to whether the NAV is set on at least a portion of the frequency bandwidth. In some embodiments, some other time duration other than PIFS may be used. In some embodiments, the energy of the medium may be measured before the CTX or other trigger frame is sent.

FIG. 5 is a time sequence diagram illustrating an example of an UL-MU-MIMO protocol 500 that may be used for UL communications. As shown in FIG. 5, and in conjunction with FIG. 1, an AP 110 may transmit a clear to transmit (CTX) message 402 to STA1 and STA2 indicating that they may participate in a UL-MU-MIMO scheme and assigning STA1 and STA2 80 MHz to transmit an uplink transmission. In this embodiment, if a STA detects that at least a portion of the assigned 80 MHz bandwidth is busy, the STA may transmit an UL transmission on the portion of the bandwidth that is not busy. In FIG. 5, STA2 transmits its UL-MU-MIMO transmission 410B on the entire allocated 80 MHz bandwidth. STA1, however, determines that a portion of its allocated 80 MHz bandwidth is busy and may only transmit on the portion of the bandwidth is available (i.e. not busy). In one aspect, the preamble of physical layer data units (PPDUs) of the UL-MU-MIMO transmissions 410A and 410B may comprise a short training field (STF) that may be duplicated on each basic channel (i.e. 20 MHz channel). In some embodiments, a basic channel may comprise a subset of the allocated bandwidth and may be defined as the smallest channel unit. For example, an 80 MHz bandwidth may comprise 4 basic channels of 20 MHz, 8 basic channels of 10 MHz, etc. In this aspect, the preamble of the PPDUs may further comprise long training fields (LTFs) transmitted on the full allocated bandwidth from an AP 110 (i.e. 80 MHz bandwidth). STAs may populate the LTFs on the bandwidths the STAs actually use for the UL-MU-MIMO transmissions 410A and 410B. Additionally, a signal (SIG) field may indicate the actual bandwidth used for the following data portions of the PPDUs.

In some embodiments, an AP 110 may request that the STAs transmit UL-FDMA transmissions. In one aspect, each STA is allocated a portion of the total bandwidth. If a STAs sees that some if its allocated bandwidth is busy, then it may not send its UL transmission.

FIG. 6 is a time sequence diagram illustrating an example of an UL-FDMA protocol 600 that may be used for UL communications. In FIG. 6, in conjunction with FIG. 1, an AP 110 may transmit a clear to transmit (CTX) message 602 to STA1 and STA2 indicating that they may participate in a UL-FDMA scheme and assigning STA1 and STA2 a combined 80 MHz to transmit. As shown in FIG. 6, STA1 is assigned the top 40 MHz (channels 625 and 630) and STA2 is assigned the bottom 40 MHz (channels 635 and 640). In one aspect, STA1 and STA2 send UL transmissions on the available bandwidth of their allocated channels. Preambles of the PPDUs are duplicated across each 20 MHz channel and the preamble includes the final bandwidth of the PPDU, as show in FIG. 6. In FIG. 6, 20 MHz channels 625, 630, 635, and 640 are allocated to STA1 and STA2 for UL-FDMA transmission. As shown, STA1 sees local channel 630 as busy, but local pre-designated channel 625 is available and STA1 therefore sends its UL-FDMA transmission 610C to the AP 110 on channel 625. Both local channels 635 and 640 are available for STA2 and thus, STA2 may transmit its UL-FDMA transmission 610D over both channels. In some embodiments, the AP 110 may assign local pre-designated channels (i.e. channels 625 and 640) for each of the STAs depending on the allocated channels. The local pre-designated channel may also be defined by the AP and/or STA and may comprise one or more of the basic channels. For example, a STA may be assigned 40 MHz with two 20 MHz basic channels. The STA and the AP may agree that the STA should transmit on the bottom 20 MHz when a portion of the full 40 MHz is unavailable. In some embodiments, the local pre-designated channel allows the AP to more quickly search for the UL transmission from the STA because the AP only needs to search on the full allocated bandwidth or the local pre-designated channel for the transmission. Each pre-designated channel would be contained within the STAs allocated channels. In this aspect, if a STA sees its local pre-designated channel 625 (or 640) is busy, then the STA may not send an UL transmission. In other embodiments, an AP 110 may define more than one local pre-designated channel for a STA and such local pre-designated channel may comprise a channel less than 20 MHz. For example, an AP 110 could define a local pre-designated channel of 20 MHz, and a local pre-designated channel of 5 MHz. If the 20 MHz local pre-designated channel is not available, but the 5 MHz local pre-designated channel is, the STA could use the 5 MHz local pre-designated channel.

In another embodiment, the AP 110 may not define a local pre-designated channel and a STA may transmit on any of its respective available bandwidth. In this aspect, the AP 110 may search the preamble of a transmitted PPDU to determine the bandwidth of the UL-FDMA transmission.

FIG. 7 is a time sequence diagram illustrating an example of an UL-FDMA protocol 700 that may be used for UL communications. In FIG. 7, in conjunction with FIG. 1, an AP 110 may transmit a clear to transmit (CTX) message 602 to STA1 and STA2 indicating that they may participate in a UL-FDMA scheme and assigning STA1 and STA2 a combined 80 MHz to transmit. As shown in FIG. 7, STA1 is assigned the top 40 MHz (channels 625 and 630) and STA2 is assigned the bottom 40 MHz (channels 635 and 640). In this embodiment, the STAs may each transmit clear to send (CTS) messages 720A and 720B back to the AP 110 using a known bandwidth (i.e. a 20 MHz CTS or a 20 MHz duplicated over multiple channels which have been allocated to them) so that the AP 110 may decode the multiple CTS messages. As shown, STA1 transmits CTS message 720B over the top 20 MHz channel 625 of its 40 MHz assigned bandwidth and STA2 transmits CTS message 720A duplicated over each 20 MHz channel 635 and 640 of its 40 MHz assigned bandwidth. The CTS messages 720A and 720B may also include an indication of the bandwidth each STA plans to use for their respective UL-FDMA transmissions 610A and 610B which may allow the AP 110 to know over which portion of the bandwidth to expect a transmission from each STA. For example, STA1 transmits the CTS message 720B only over the top 20 MHz channel 625 which indicates that STA1 will also send its UL-FDMA transmission 610A over the same channel 625. This indication may be included in a scrambling sequence of the CTS service field. In one aspect, the AP 110 may define a local pre-designated channel for the CTS messages 720A and 720B of each STA so that the AP 110 knows where to find the CTS messages 720A and 720B. In some embodiments, the sum total of bandwidth may not be restricted to 80 MHz, it could be any amount.

In some embodiments, it may be beneficial for a STA to check its CCA after a message assigning a bandwidth to the STA (i.e. a CTS or CTX) and before the STA transmits an uplink transmission to avoid interference and ensure the availability of its allocated bandwidth. In one aspect, a STA may check its CCA in the SIFS time before transmission.

Figure 8:
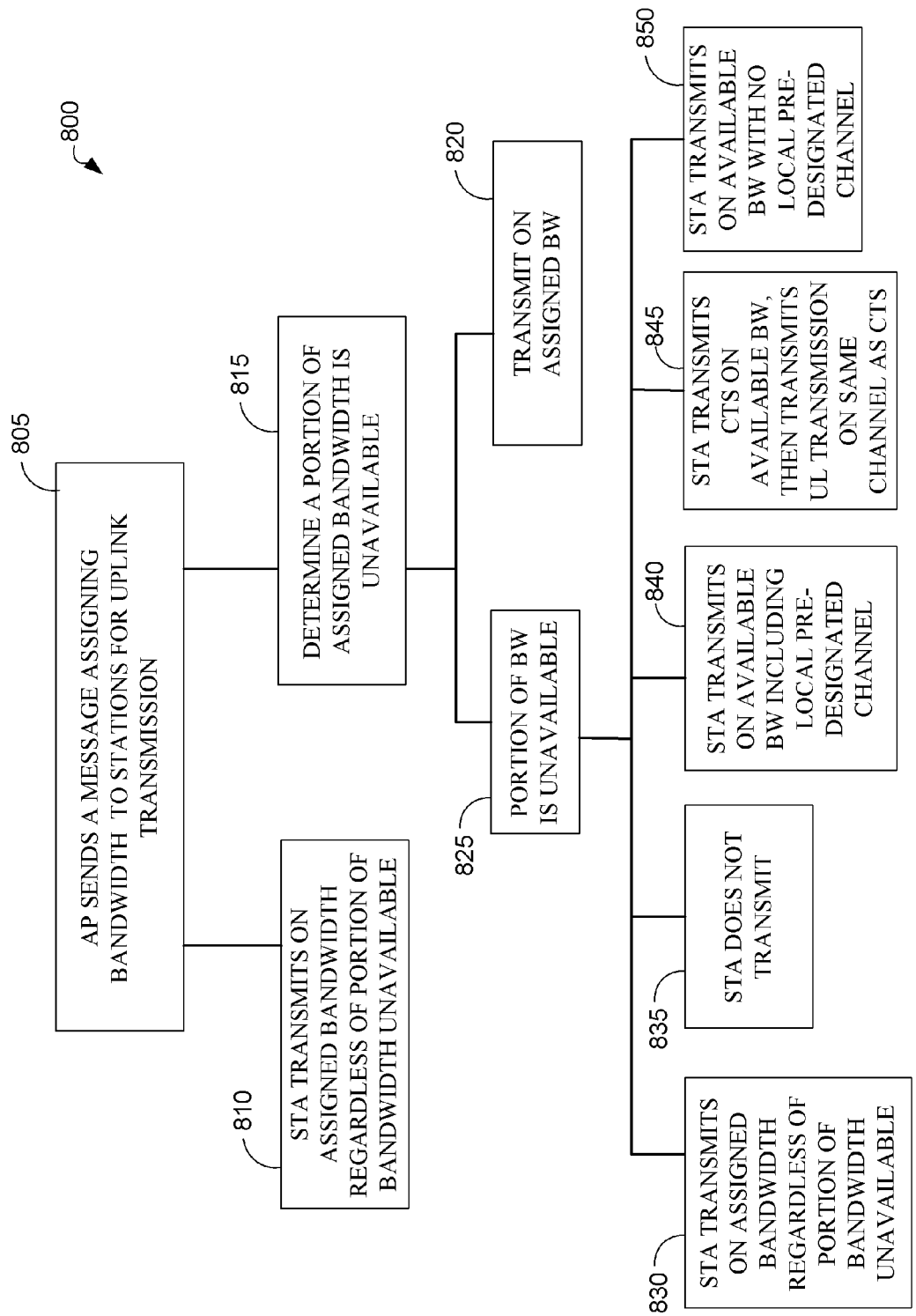
FIG. 8 is a flow chart of an aspect of an exemplary method for providing wireless communication.

FIG. 8 is a flow chart of an exemplary method 800 for wireless communication in accordance with certain embodiments described herein. As described in method 800, an AP (e.g., AP 110) transmits a message to one or more STAs (e.g., STA1 and STA2) or user terminals 120, however, in other embodiments, the communications described in method 800 may occur between two or more AP 110, two or more STAs or any combination of AP 110s and STAs (or user terminals 120).

In operation block 805, the AP 110 sends a message assigning a frequency bandwidth to two or more stations (e.g., STA1 and STA2) for an uplink transmission. In some embodiments, the message may comprise CTX message 402 or 602. At block 810, a station receiving the message may transmit the uplink transmission on its full assigned bandwidth without first determining whether a portion of the bandwidth is unavailable and regardless of whether a portion of the bandwidth is unavailable. In some aspects, this method of transmitting regardless of whether a portion of the assigned bandwidth is unavailable may increase transmission error and reduce throughput. In some embodiments, at block 815, the stations receiving the message may then determine whether a portion of the assigned bandwidth is unavailable. In some embodiments, the station may check the CCA or check whether a NAV is set on the bandwidth to determine whether a portion of the assigned bandwidth is unavailable. If the station determines that the entire assigned bandwidth is available, then at block 820 the stations may transmit on the full assigned bandwidth.

At block 825, the station determines a portion of the assigned bandwidth is unavailable. Since the station determined that a portion of the assigned bandwidth is unavailable, the station may selectively transmit the uplink transmission based on whether a portion of the assigned bandwidth is unavailable. At block 830, the station transmits on the assigned bandwidth regardless of whether a portion of the bandwidth is unavailable. At block 835, the station does not transmit the uplink transmission when any portion of the assigned frequency bandwidth is unavailable. At block 840, the station transmits on the available portion of the assigned bandwidth including the local pre-designated channel. In this embodiment, when the local pre-designated channel is unavailable, the station does not transmit the uplink transmission. In some embodiments, the station may transmit on more than one pre-designated channel or on a pre-designated channel and a secondary channel. At block 845, the station transmits a CTS message (e.g., CTS message 720A, 720B) on a portion of the assigned bandwidth that is available. The CTS messages 720A and 720B may indicate the portion of the assigned bandwidth the station plans to use for its uplink transmission. In block 850, the station transmits on the available portions of the assigned bandwidth without an assigned pre-designated channel. In this embodiment, the AP 110 may search a preamble of the uplink transmission (e.g., UL-FDMA transmission 610A, 610B, 610C) to determine which channel or channels each station is transmitting on. In some embodiments, the AP 110 may search each basic channel of the assigned bandwidth to determine if station is transmitting an uplink transmission.

Figure 9:
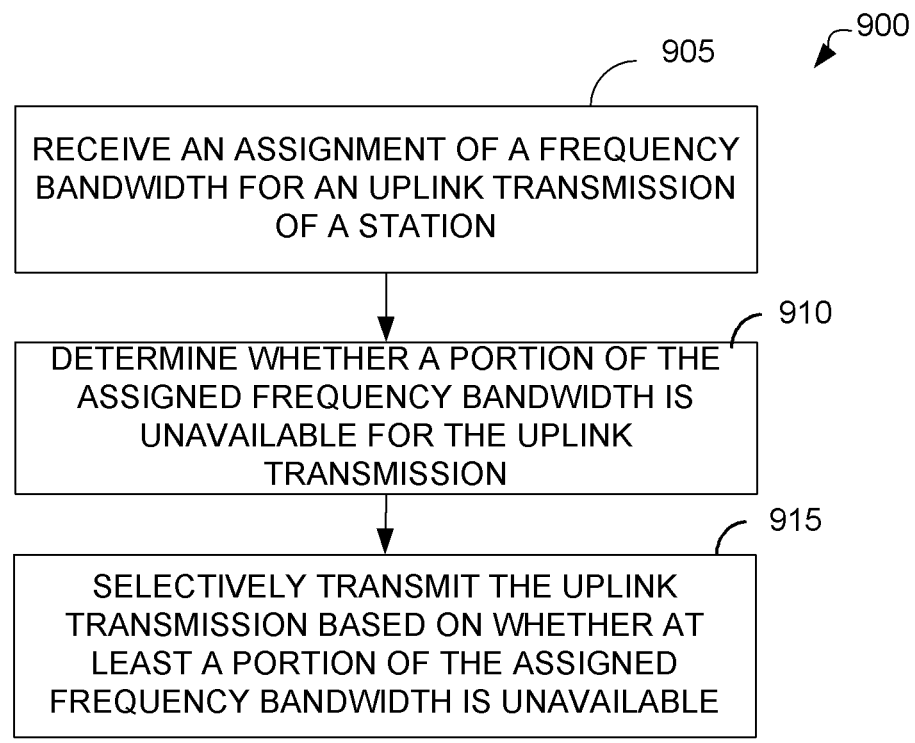
FIG. 9 is a flow chart of an aspect of an exemplary method for providing wireless communication.

FIG. 9 is a flow chart of an exemplary method 900 for wireless communication in accordance with certain embodiments described herein. The method 900 may be used to generate and transmit any of the messages described above. The messages may be transmitted by one or more of the user terminals 120 to the AP 110 as shown in FIG. 1. In addition, the wireless device 302 shown in FIG. 3 may represent a more detailed view of the AP 110, the user terminals 120, or the STAs 1 and 2, as described above. Thus, in one implementation, one or more of the steps in flowchart 900 may be performed by, or in connection with, a processor and/or transmitter, such as the processor 304 and transmitter 310 of FIG. 3, although those having ordinary skill in the art will appreciate that other components may be used to implement one or more of the steps described herein.

In operation block 905, a user terminal 120 may receive an assignment of a frequency bandwidth for an uplink transmission of a station. In operational block 910, the user terminal 120 may determine whether a portion of the assigned frequency bandwidth is unavailable for the uplink transmission. In operational block 915, the user terminal 120 may selectively transmit the uplink transmission based on whether at least a portion of the assigned frequency bandwidth is unavailable.

In some embodiments, an apparatus for wireless communication may perform one or more of the functions of the method 900. In some embodiments, the apparatus may comprise means for receiving an assignment of a frequency bandwidth for an uplink transmission of a station. The apparatus may further comprises means for determining whether a portion of the assigned frequency bandwidth is unavailable for the uplink transmission. The apparatus may further comprise means for selectively transmitting the uplink transmission based on whether at least a portion of the assigned frequency bandwidth is unavailable. In some embodiments, the means for receiving may comprise the receiver 312 of FIG. 3. In some embodiments, the means for determining may comprise the processor 304 or the DSP 320. In some embodiments, the means for selectively transmitting may comprise the transmitter 310.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
    receiving an assignment of a frequency bandwidth for an uplink transmission of a station;
    determining whether a portion of the assigned frequency bandwidth is unavailable for the uplink transmission; and
    transmitting the uplink based on whether the portion of the assigned frequency bandwidth is unavailable, the uplink comprising a preamble portion indicating a portion of the assigned frequency bandwidth used for the uplink transmission, wherein the preamble includes a training field that is duplicated on each channel used by the station for transmitting the uplink.

2. The method of claim 1, wherein the assignment of the frequency bandwidth identifies one or more pre-designated channels for the uplink transmission, and wherein transmitting comprises refraining from transmitting the uplink when at least a portion of the one or more pre-designated channel is unavailable.

3. The method of claim 2, wherein the one or more pre-designated channels includes channels having a bandwidth less than or equal to 20 MHz.

4. The method of claim 2, wherein each of the one or more pre-designated channels has the same bandwidth.

5. The method of claim 2, wherein the one or more pre-designated channels include at first channel having a first bandwidth and a second channel having a second bandwidth, the first bandwidth being different than the second bandwidth.

6. The method of claim 5, wherein the first bandwidth is 20 MHz and the second bandwidth is 5 MHz.

7. The method of claim 5, wherein transmitting comprises transmitting on the first channel when the second channel is unavailable.

8. The method of claim 5, wherein the one or more pre-designated channels includes a secondary channel.

9. The method of claim 1, wherein the assignment includes an instruction for the station to transmit the uplink using an uplink multiple user multiple-input multiple-output (MU-MIMO) transmission or an uplink multiple user frequency division multiple access (MU-FDMA) transmission.

10. The method of claim 1, wherein transmitting comprises transmitting on an available portion of the assigned bandwidth or on a subset of the available portion of the assigned bandwidth.

11. The method of claim 1, wherein the uplink transmission includes a physical layer data unit (PPDU) having a preamble.

12. The method of claim 11, wherein the preamble includes a training field that is transmitted over the entire transmission frequency bandwidth used by the station for transmitting the uplink.

13. The method of claim 11, wherein the preamble includes a signal field that is duplicated on each channel used by the' station for transmitting the uplink, the signal field indicating a bandwidth used for a data portion of the PPDU.

14. The method of claim 1, further comprising transmitting a clear to send (CTS) frame in response to receiving the assignment indicating a portion of the assigned frequency bandwidth used for the uplink transmission.

15. The method of claim 1, wherein determining whether the portion of the assigned bandwidth is unavailable for the uplink transmission is based on determining whether a clear channel assessment indicates a busy medium during a time period after receiving the assignment and before transmitting the uplink.

16. The method of claim 15, wherein transmitting the uplink comprises transmitting the uplink based further on the clear channel assessment.

17. The method of claim 15, wherein the time period comprises a short inter-frame space (SIFS) time.

18. An apparatus for wireless communication comprising:
    a receiver configured to receive an assignment of a frequency bandwidth for an uplink transmission of a station;

a processor configured to determine whether a portion of the assigned frequency bandwidth is unavailable for the uplink transmission; and a transmitter configured to transmit the uplink based on whether the portion of the assigned frequency bandwidth is unavailable, the uplink comprising a preamble portion indicating a portion of the assigned frequency bandwidth used for the uplink transmission, wherein the preamble includes a training field that is duplicated on each channel used by the station for transmitting the uplink.

19. The apparatus of claim 18, wherein the assignment of the frequency bandwidth identifies one or more pre-designated channels for the uplink transmission, and wherein the transmitter is further configured to refrain from transmitting the uplink when at least a portion of the one or more pre-designated channel is unavailable.

20. The apparatus of claim 19, wherein the one or more pre-designated channels includes channels having a bandwidth less than or equal to 20 MHz.

21. The apparatus of claim 19, wherein each of the one or more pre-designated channels has the same bandwidth.

22. The apparatus of claim 19, wherein the one or more pre-designated channels include a first channel having as first bandwidth and a second channel having a second bandwidth, the first bandwidth being different than the second bandwidth.

23. The apparatus of claim 22, wherein the first bandwidth is 20 MHz and the second bandwidth is 5 MHz.

24. The apparatus of claim 22, wherein transmitting comprises transmitting on the first channel when the second channel is unavailable.

25. The apparatus of claim 19, wherein the one or more pre-designated channels includes a secondary channel.

26. The apparatus of claim 18, wherein the transmitter is further configured to transmit the uplink using an uplink multiple user multiple-input multiple-output (MU-MIMO) transmission or an uplink multiple user frequency division multiple access (MU-FDMA) transmission based on the assignment.

27. The apparatus of claim 18, wherein the transmitter is further configured to transmit on an available portion of the assigned bandwidth or on a subset of the available portion of the assigned bandwidth.

28. The apparatus of claim 18, wherein the uplink transmission includes a physical layer data unit (PPDU) having a preamble.

29. The apparatus of claim 28, wherein the preamble includes a training field that is transmitted over the entire transmission frequency bandwidth used by the station for transmitting the uplink.

30. The apparatus of claim 28, wherein the preamble includes a signal field that is duplicated on each channel used by the station for transmitting the uplink, the signal field indicating a bandwidth used for a data portion of the PPDU.

31. The apparatus of claim 28, wherein the processor is further configured to determine whether a clear channel assessment indicates a busy medium during a time period after receiving the assignment and before transmitting the uplink, and wherein the transmitter is further configured to transmit the uplink based further on the clear channel assessment.

32. An apparatus for wireless communication comprising:
means for receiving an assignment of a frequency bandwidth for an uplink transmission of a station;
means for determining whether a portion of the assigned frequency bandwidth is unavailable for the uplink transmission; and
means for transmitting the uplink based on whether the portion of the assigned frequency bandwidth is unavailable, the uplink comprising a preamble portion indicating a portion of the assigned frequency bandwidth used for the uplink transmission, wherein the preamble includes a training field that is duplicated on each channel used by the station for transmitting the uplink.

33. The apparatus of claim 32, wherein the assignment of the frequency bandwidth identifies one or more pre-designated channels for the uplink transmission, and wherein the means for transmitting comprises means for refraining from transmitting the uplink when at least a portion of the one or more pre-designated channel is unavailable.

34. The apparatus of claim 32, wherein the assignment further includes an instruction for the station to transmit the uplink using an uplink multiple user multiple-input multiple-output (MU-MIMO) transmission or an uplink multiple user frequency division multiple access (MU-FDMA) transmission.

35. The apparatus of claim 33, wherein the one or more pre-designated channels includes channels having a bandwidth less than or equal to 20 MHz.

36. A non-transitory computer readable medium comprising instructions that when executed cause a processor to perform a method of:
receiving an assignment of a frequency bandwidth for an uplink transmission of a station;
determining whether a portion of the assigned frequency bandwidth is unavailable for the uplink transmission; and
transmitting the uplink based on whether the portion of the assigned frequency bandwidth is unavailable, the uplink comprising a preamble portion indicating a portion of the assigned frequency bandwidth used for the uplink transmission, wherein the preamble includes a training field that is duplicated on each channel used by the station for transmitting the uplink.

* * * * *